(No Model.)
A. KRIEGER.
HOLDER FOR INSERTIBLE SAW TEETH.
No. 493,334. Patented Mar. 14, 1893.
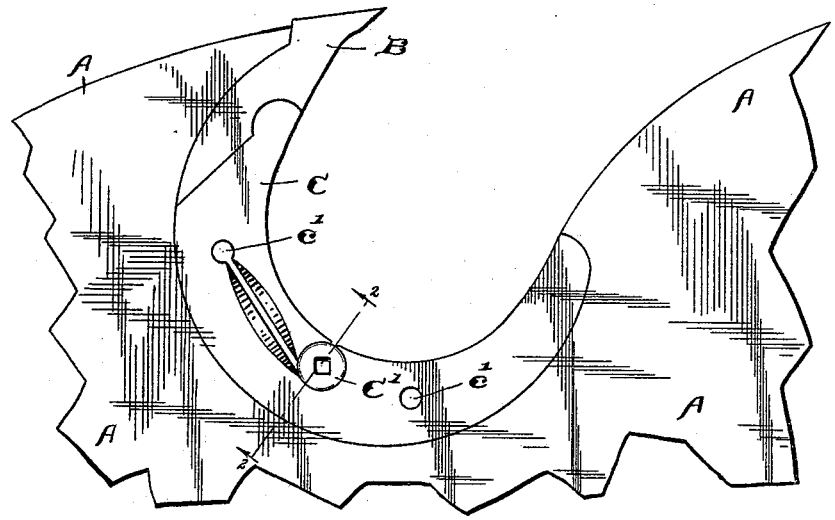
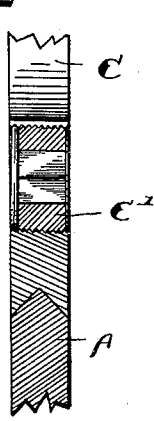
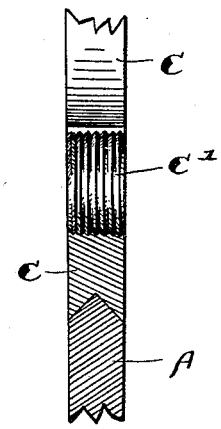
WITNESSES:
F. W. Warner
J. A. Walsh
INVENTOR
Andrew Krieger
per
Chester Bradford,
ATTORNEYS.

UNITED STATES PATENT OFFICE.

ANDREW KRIEGER, OF INDIANAPOLIS, INDIANA, ASSIGNOR TO THE E. C. ATKINS & COMPANY, OF SAME PLACE.

HOLDER FOR INSERTIBLE SAW-TEETH.

SPECIFICATION forming part of Letters Patent No. 493,334, dated March 14, 1893.

Application filed July 14, 1892. Serial No. 440,061. (No model.)

*To all whom it may concern:*

Be it known that I, ANDREW KRIEGER, a citizen of the United States, residing at Indianapolis, in the county of Marion and State of Indiana, have invented certain new and useful Improvements in Holders for Insertible Saw-Teeth, of which the following is a specification.

The teeth of inserted toothed saws, as is well known, frequently become loosened after a period of use, and require tightening. Heretofore it has been common, among operatives, to attempt to do this by hammering the exposed edge of the holder. This has resulted in distorting the shape of the holder, impairing its fit in the socket, and sometimes in changing the tension of the saw plate.

To obviate these difficulties is the purpose of my present invention, and this is accomplished by means of a tapered plug passing through the body of the holder at its front or exposed edge, whereby the holders may be expanded without hammering so as to tightly clamp the teeth, as will be hereinafter more particularly described and claimed.

Referring to the accompanying drawings, which are made a part hereof, and on which similar letters of reference indicate similar parts, Figure 1 is a side elevation of a fragment of a circular saw, showing one inserted tooth and its holder, of a form embodying my said invention; Fig. 2 a transverse sectional view through the holder, on an enlarged scale, at the point where the plug is inserted, showing said plug also in section, and Fig. 3 a similar view, except that the plug is shown in elevation.

In said drawings the portions marked A represent the fragment of the saw; B the saw tooth, and C the holder. The saw A is of substantially the ordinary form. It contains a socket of the form required to receive the tooth and holder. The tooth B is also of any desired form, a preferred form being shown.

The holder C has the ordinary holes $c'$ by which it is driven to place in the socket in the saw blade. It also has another, and preferably somewhat larger hole, which opens through the exposed edge, in which is the plug C'. This plug, as shown most plainly in Figs. 2 and 3, should be screw-threaded and tapered slightly, and somewhat shorter than the thickness of the holder. When this plug is driven in it will expand said holder somewhat and press it with greater force against the tooth B, as will be readily understood. Its length being shorter than the thickness of the holder permits a variation in position without causing it to project on either side. The holder is shown as slotted, thus giving a spring character to the device. I do not, however, desire to confine myself to any particular form of holder, but may vary the same at pleasure. The form shown I regard as a good one for the purpose, and is claimed in my application Serial No. 440,060 of even date herewith.

In putting the tooth and holder in place they are put together and turned into the socket and forced to place by means of a pin put through one of the holes $c'$, and a hammer or other force, as is usual. When the final position is reached the holder is expanded somewhat by turning the screw-plug, which may be done by means of a wrench which enters the hole in said screw-plug. Said hole is shown as square, and this is the most convenient form, but other forms may be employed if desired.

A longitudinal slot in the holder is shown as having beveled sides so as to easily discharge any substance, as sawdust and the like, which might otherwise accumulate therein, thus making the holder again substantially solid and defeating the purpose of the slot.

Having thus fully described my said invention, what I claim as new, and desire to secure by Letters Patent, is—

1. A holder for insertible saw teeth having a screw-threaded hole opening out to its exposed edge, and a screw-threaded plug inserted in said hole, whereby said holder may be expanded.

2. A holder for insertible saw teeth having a tapered screw-threaded hole opening out to its exposed edge, and a correspondingly tapered screw-plug shorter than the thickness of the holder inserted therein, and provided with a central orifice suitable to receive a wrench whereby the same may be turned, substantially as set forth.

3. The combination of a holder for insertible saw teeth having a longitudinal bevel-sided slot and a hole cutting through from the exposed edge to said slot, and a plug inserted in said hole, substantially as shown and described.

In witness whereof I have hereunto set my hand and seal, at Indianapolis, Indiana, this 7th day of July, A. D. 1892.

ANDREW KRIEGER. [L. S.]

Witnesses:
CHESTER BRADFORD,
J. A. WALSH.